United States Patent [19]

Nakashima

[11] 4,082,959

[45] Apr. 4, 1978

[54] LIQUID LEVEL DETECTOR

[75] Inventor: Noriyuki Nakashima, Nagoya, Japan

[73] Assignee: Nippondenso Co., Ltd., Kariya, Japan

[21] Appl. No.: 699,607

[22] Filed: Jun. 24, 1976

[30] Foreign Application Priority Data

Jun. 27, 1975  Japan .................................. 50-80176
Jul. 23, 1975  Japan .................................. 50-90662

[51] Int. Cl.² ........................................... G01N 21/26
[52] U.S. Cl. ................................ 250/577; 250/227; 73/293
[58] Field of Search ............... 250/577, 227; 73/313, 73/308, 293; 350/96 R, 96 B; 356/133

[56] References Cited

U.S. PATENT DOCUMENTS

| | | | |
|---|---|---|---|
| 3,120,125 | 2/1964 | Vasel | 73/293 |
| 3,384,885 | 5/1968 | Forbush | 73/293 |
| 3,683,196 | 8/1972 | Obenhaus | 250/227 |
| 3,834,235 | 9/1974 | Bouton et al. | 73/293 |
| 3,895,235 | 7/1975 | Melone | 250/577 |

Primary Examiner—David C. Nelms
Assistant Examiner—Vincent J. Sunderdick
Attorney, Agent, or Firm—Cushman, Darby & Cushman

[57] ABSTRACT

In an optical detector which comprises on U-shaped transparent bar, a photoemitting diode disposed at one end of the bar and a phototransistor disposed at the other end of the bar, means for ensuring light-transmission is provided.

6 Claims, 6 Drawing Figures

FIG. 4.
FIG. 5.
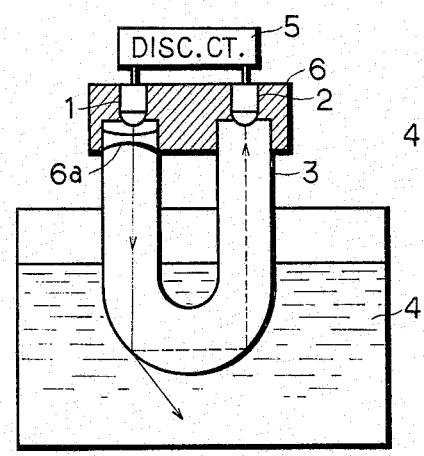
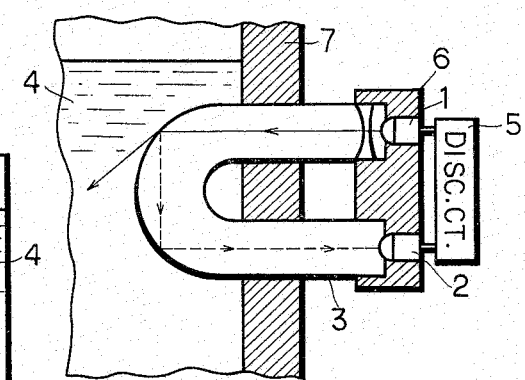
FIG. 6.
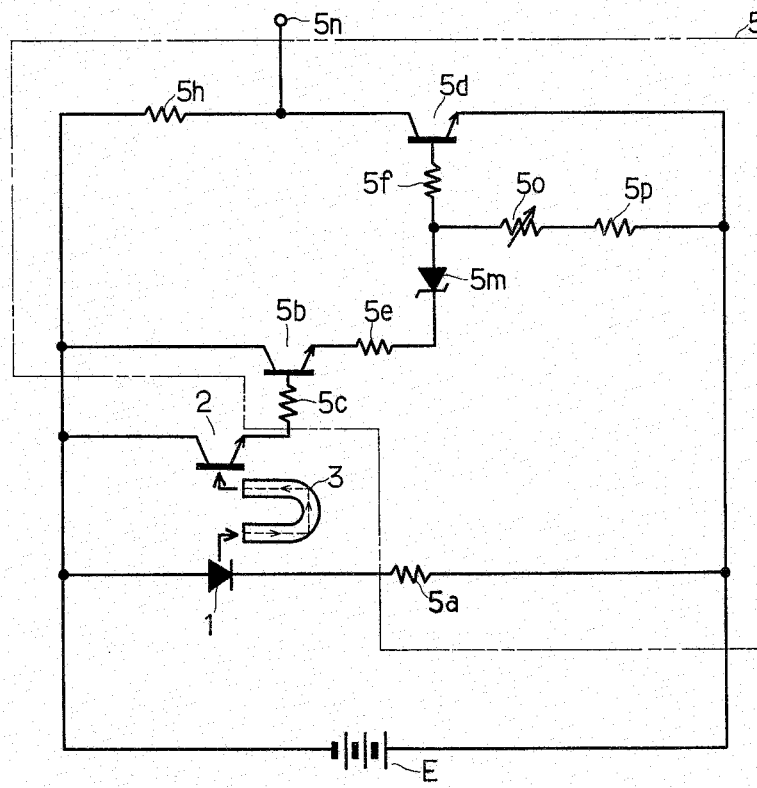

LIQUID LEVEL DETECTOR

CROSS-REFERENCE TO RELATED APPLICATION

This invention is related to copending Nakashima et al. U.S. patent application Ser. No. 648,737 entitled "Liquid Level Detector" filed on Jan. 13, 1976.

BACKGROUND OF THE INVENTION

This invention relates to a detector utilizing the total reflection characteristic of light in an U-shaped bar to detect presence of an object which may be liquid, vapor and the like.

The conventional optical sensor, as shown in the Japanese patent publication 12-1225, comprises a U-shaped transparent bar with the bent portions disposed at a preset level of liquid in a container, a lamp at one end of the U-shaped bar and an inspecting portion at the other end. At the inspecting portion, one has to determine with his eyes the presence or absence of the liquid by observing change in the brightness thereon. Consequently, it is impossible to detect the liquid level remote from the liquid container. The conventional detector is formed with 45° cut surfaces at both bent portions to ensure that light does not leak into the inspecting portion at the other end when it is immersed in the liquid.

SUMMARY OF THE INVENTION

It is a primary object of the present invention to obviate the above described inconvenience.

It is another object of the present invention is to provide a detector which comprises an U-shaped transparent bar with a pair of bent portions disposed at a preset level of an object to be detected, a lamp mounted at one end of the bar, a light receiver at the other end of the bar, means for ensuring light incident into the bar and a light discriminator.

BRIEF DESCRIPTION OF THE DRAWING

FIG. 4 shows a second embodiment of the present invention, FIG. 5 shows the second embodiment in different use, and FIG. 6 is another circuit diagram for the discriminating circuit.

DETAILED DESCRIPTION

Figure 1:
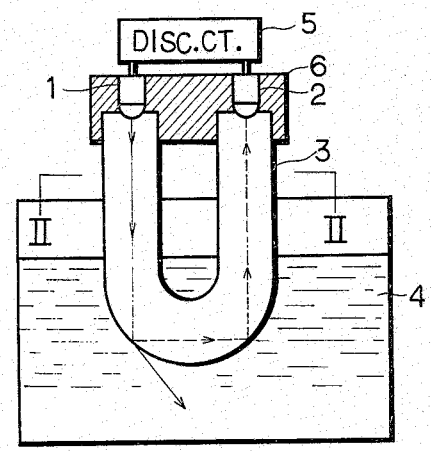
FIG. 1 is a schematic view of an embodiment according to the present invention.

FIG. 1 shows a liquid level detector. A photo emitting diode 1 and a photo transistor 2 are respectively disposed at the both ends of an U-shaped transparent glass bar 3 of a uniform light-refractive index. The U-shaped glass bar 3 has such a straight light-transmissivity that when a pair of bent portions of the U-shaped bar are immersed in the liquid 4 such as gasoline or water, the light emitted from the photo emitting diode is transmitted into the liquid at one of the bent portions, and that when same are out of the liquid, the incident light is reflected at said bent portion to be transmitted, along the U-shaped bar, to the photo transistor 2.

Figure 2:
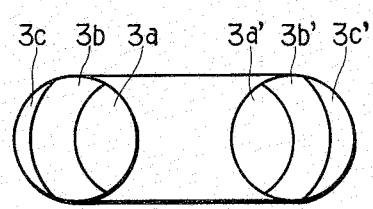
FIG. 2 is an enlarged sectional view of the U-shaped bar in section along the line II—II of FIG. 1.

A discriminating circuit 5 energizes the photo emitting diode and generates a signal when the light quantity received by the photo transistor reaches a predetermined value. A holder 6 secures the photo emitting diode 1 and the photo transistor 2 within an effective light-transmitting area of the U-shaped bar to ensure the incident light quantity received by the photo transistor. The effective light-transmitting area will be explained next referring to FIG. 2. In FIG. 2, the sectional plan view of the U-shaped bar in section along the line II—II of FIG. 1 is shown. Numerals 3a and 3a' designate an internal ineffective light transmitting area, numerals 3b and 3b' show the effective light-transmitting area and numerals 3c and 3c' show an external ineffective light-transmitting area. The photo emitting diode 1 is disposed within the effective light-transmitting area 3b at one end of the U-shaped bar and the photo transistor 2 is disposed in the effective light-transmitting area 3b' at the other end. With both the photo-emitting diode 1 and the photo transistor 2 disposed as described above, the light transmissivity can be well secured solely by bending the glass bar into a U-shape, reshaping the bent portion, if necessary. It is noted that the effective light-transmitting area varies widely with degree of bending.

On the other hand, when the photoemitting diode 1 is positioned within the internal ineffective light-transmitting area 3a, a substantial part of the light flux is refracted at the bent portion thereby to go out of the U-shaped bar no matter whether the U-shaped bar is immersed in the liquid or not. As a result, the light received by the phototransistor 2 is not related to the liquid level. When the photoemitting diode 1 is positioned within the external effective light-transmitting area 3c, the light flux emitted by the photoemitting diode 1 is totally reflected to be transmitted along the U-shaped bar to the phototransistor 2 at the other end of external effective light-transmitting area 3c', resulting that the light received by the phototransistor 2 is independent of the liquid level.

Figure 3:
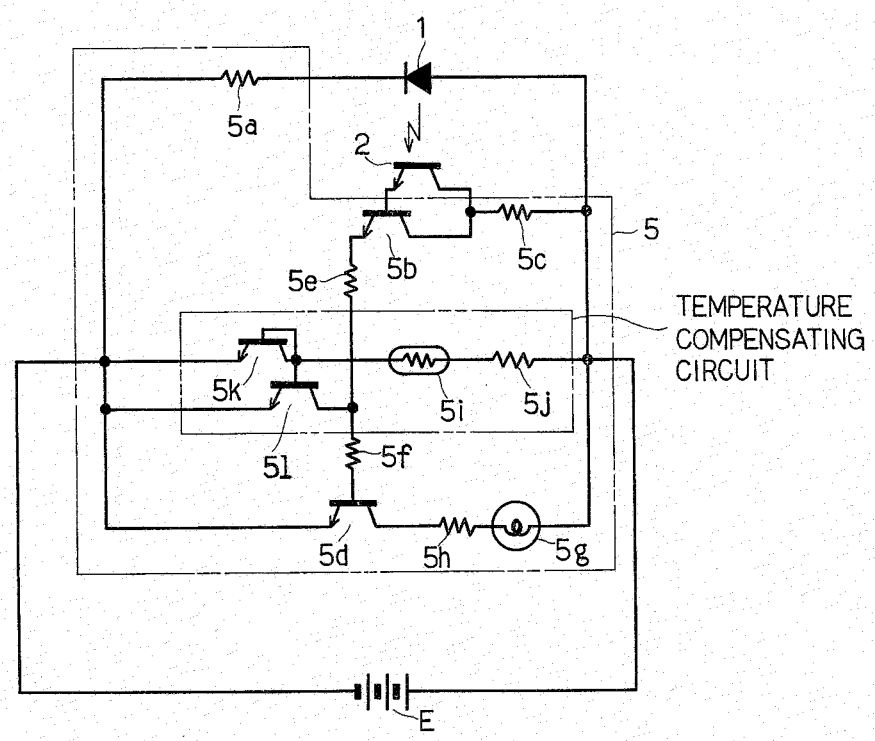
FIG. 3 is a circuit diagram for the discriminating circuit shown in FIG. 1.

Next will be explained the details of the discrimination circuit 5 with reference to FIG. 3. The photoemitting diode 1 is connected to a resistor 5a to limit the current supplied thereto. The phototransistor 2 is connected to a diode 5b to form Darlington circuit therewith to obtain a sufficient amplification. A power transistor 5d is connected through resistors 5e and 5f to the transistor 5b to switch on and off a power circuit including an indicating lamp 5g and a current limiting resistor 5h in response to operation of the transistor 5b. a temperature compensating circuit which comprises a thermistor 5i a resistor 5j, transistors 5k and 5l are connected to the input of the power transistor 5b through the resistor 5f.

In operation, when liquid to be detected is above a predetermined level and the bent portions of the U-shaped bar are immersed in the liquid, the light flux emitted from the photoemitting diode 1 into one end of the U-shaped bar is refracted to go into the liquid. As a result, the light is not received at the other end of the U-shaped bar and the phototransistor 2 produce no detection current, keeping transistors 5b and 5d in the nonconductive state, and the indicating lamp 5g is not energized.

On the other hand, when the liquid is decreased to be under the preset level and the bent portions comes out of the liquid, the light from the photoemitting diode 1 at one end of the U-shaped bar 3 is totally reflected therein to reach the other end thereof. As a result, the phototransistor generates in response to the light transmitted along the U-shaped bar a detection current, which is amplified by the transistor 5b to render the power transistor 5d conductive, energizing the indicating lamp 5g. The lamp 5g indicates a specific state of the liquid level, "empty" or the like. The lamp 5g may be replaced by some other indicating means such as a buzzer.

It should be noted that the signal of liquid level is electric and, therefore, the level indication remote from the liquid can be easily attained.

When the ambient temperature rises, the resistance value of the thermistor 5i of the temperature compensating circuit decreases to make the transistor 5l bypass the base current of the power transistor 5d, thereby compensating variation of the base current caused by the dark current of phototransistor 2 varying with the ambient temperature. Other light receiving elements such as photodiode can be also used in place of the photo transistor 2.

A second embodiment of the present invention shown in FIG. 4 is provided with a concave lens 6a disposed in front of the photoemitting diode. The concave lens 6a is so arranged that the light emitted from the photoemitting diode 1 is modified to be parallel with respect to the axis of the U-shaped bar over the entire range thereof. In this embodiment, it is not necessary to secure the photoemitting diode within the effective light-transmitting area.

In FIG. 5, the second embodiment is secured to a side wall 7 of a liquid container in the manner that the U-shaped bar 3 is disposed in parallel with the liquid level. Thus, the liquid level can be detected by same-sized U-shaped bar no matter how much the liquid level changes.

Needless to say, other embodiments can be employed in this arrangement.

FIG. 6 shows another discrimination circuit 5. In this circuit, a zener diode 5m is connected between an amplifying transistor 5b and a power transistor 5d. Other elements designated by same reference numerals are the same or equivalent to those of FIG. 3. Due to the diode 5m, the power transistor 5d is made conductive only when the output signal of the photo transistor 2 reaches a predetermined level so that the output voltage of the transistor 5b breaks the zener diode 5m. When the power transistor 5d is made conductive, an output signal is produced at a terminal 5n, by which some warning means or control means (not shown) is operated.

In the above description of the preferred embodiment, the object to be detected is liquid, however vapor or gases are also applicable if the light refractive index of the object satisfies the condition which is described in our copending application Ser. No. 648,737 previously noted.

What is claimed is:

1. An optical detector comprising:
   a U-shaped transparent glass bar having an incidence light path portion having an open end, a reflected light path portion having an open end and an intermediate bent portion connecting said incidence and reflected light path portions circularly at a predetermined detection position within a container for holding a liquid to be detected, said incidence light path portion and said reflected light path portion being separated and extending parallel to each other to allow said liquid to fill the space therebetween;
   light emitting means for emitting light toward the open end of said incidence light path portion;
   lens means, coupled to said incidence light path portion to deform the open end of said light path portion to be either concave or convex, for rendering the light emitted from said light emitting means to be transmitted to said intermediate bent portion through said incidence light path portion in parallel with the axis of said incidence light path portion;
   light receiving means for receiving the light reflected by said intermediate bent portion and transmitted through said reflected light path portion; and
   discriminating means for discriminating whether the level of said liquid has reached said predetermined position in accordance with the quantity of the reflected light received by said light receiving means at the open end of said reflected light path portion.

2. An optical detector according to claim 1, wherein said light receiving means includes a phototransistor adapted to be rendered conductive upon receipt of the reflected light transmitted through said reflected light path portion, and wherein said discriminating means includes an indicator for indicating the level of said liquid in response to the output signal of said phototransistor, and a temperature compensating circuit for compensating the output signal of said phototransistor in accordance with the ambient temperature.

3. An optical detector according to claim 2, wherein said temperature compensating circuit is connected between said phototransistor and said indicator and includes a temperature responsive sensor for decreasing the output signal of said phototransistor with the increase of the ambient temperature.

4. An optical detector comprising:
   a U-shaped transparent bar having an incidence light path portion having an open end, a reflected light path portion having an open end and an intermediate bent portion connecting said two light path portions circularly at a predetermined detection position within a container, said two light path portions being separated from each other to allow a light refractive medium having a light refractive index different from that of said transparent bar to enter the space therebetween;
   light emitting means, coupled to the open end of said incidence light path portion, for emitting the light which is transmitted to said intermediate bent portion through said incidence light path portion;
   light receiving means, coupled to the open end of said reflected light path portion, for receiving the light reflected by said bent portion and transmitted through said reflected light path portion; and
   medium detecting means, connected to said light receiving means and including a temperature detecting element, for detecting the existence of said light refractive medium around said intermediate bent portion in accordance with both the quantity of the reflected light received by said light receiving means and the ambient temperature detected by said temperature detecting element.

5. An optical detector according to claim 4, further comprising:
   lens means, coupled to the open end of said incidence light path portion, for rendering the light emitted from said light emitting means to be transmitted through said incidence light path portion in parallel with the axis of said incidence light path portion.

6. An optical detector according to claim 5, wherein said U-shaped transparent bar is supported by said container such that the open ends of said two light path portions and said intermediate bent portion are positioned outside and inside said container, respectively.

* * * * *